(12) United States Patent
Honma

(10) Patent No.: US 7,425,040 B1  
(45) Date of Patent: Sep. 16, 2008

(54) OUTDOOR VEHICLE SEAT

(75) Inventor: Yuichi Honma, Tochigi (JP)

(73) Assignee: TS Tech Co., Ltd. (JP)

( * ) Notice: Subject to any disclaimer, the term of this patent is extended or adjusted under 35 U.S.C. 154(b) by 0 days.

(21) Appl. No.: 11/837,205

(22) Filed: Aug. 10, 2007

(30) Foreign Application Priority Data

Mar. 19, 2007 (JP) ............................ 2007-070651

(51) Int. Cl.
   *A47C 7/02* (2006.01)
(52) U.S. Cl. .................. 297/452.57; 297/452.58; 297/452.59; 297/463.1
(58) Field of Classification Search ............ 297/219.1, 297/452.57, 452.58, 452.59, 463.1, 463.2
See application file for complete search history.

(56) References Cited

U.S. PATENT DOCUMENTS

| | | | | |
|---|---|---|---|---|
| 2,185,758 A | * | 1/1940 | Todd et al. | 5/402 |
| 2,268,765 A | * | 1/1942 | Monroe | 297/452.59 |
| 4,836,609 A | * | 6/1989 | Hill | 297/452.55 |
| 5,176,860 A | * | 1/1993 | Storch | 264/46.6 |
| 5,433,994 A | * | 7/1995 | McKinney et al. | 442/221 |
| 5,452,525 A | * | 9/1995 | Miyauchi | 36/44 |

FOREIGN PATENT DOCUMENTS

JP          09-286364          11/1997

\* cited by examiner

*Primary Examiner*—Laurie K Cranmer  
(74) *Attorney, Agent, or Firm*—Schiff Hardin LLP

(57) ABSTRACT

An outdoor vehicle seat is formed by placing a cushioning material on a bottom plate, and covering them with a surface skin, and fixing a surface skin end portion onto the bottom plate. Further, a highly water absorbing, highly moisture absorbing, and highly expanding member is arranged between the surface skin end portion and the bottom plate.

18 Claims, 10 Drawing Sheets

OUTDOOR VEHICLE SEAT

BACKGROUND

The present invention relates to an outdoor vehicle seat, particularly to an outdoor vehicle seat for preventing deterioration due to water penetration.

In the prior art, vehicle seats used outdoors, for motorbikes, personal watercraft and the like, have been subject to wind and rain, or submersion under water, and water may have penetrated into the inside of seats. When water penetrates into the inside of the seat, water is absorbed in its inside cushioning material, the weight of the entire seat increases significantly, deterioration of the cushioning material causes it to lose its soft touch, and the seat functions more poorly, which has been problems in the prior art.

In order to solve these problems, it is known to have a sealing member arranged at a joint portion of a seat surface skin end portion and a bottom plate (for example, see Japanese Unexamined Patent Application Publication No. 9-286364 ("the '364 Publication")).

In the waterproof structure at the surface skin end portion used in a seat described in the '364 Publication, as shown in FIG. 9, a surface skin end portion 130a of the seat and an elastic sealing member 150 are jointed at a stitched portion 160 by machine-sewing, and the surface skin end portion 130a to which the elastic sealing member 150 is jointed, and a bottom plate 110 on which a cushioning material 120 is arranged, are jointed by a fixing member 140 such as a staple and the like.

Meanwhile, according to the waterproof structure of the surface skin end portion used in the seat described in the '364 Publication, there are cases where water cannot be prevented from penetrating from the portion between the elastic sealing member 150 and the bottom plate. In particular, at the curved portion of the bottom plate, the surface skin end portion is attached having wrinkles due to surface skin surplus, and, as shown in FIG. 10, a gap is formed between the surface skin 130 and the elastic sealing member 150 in some cases. When it rains or the seat is submerged under water, water penetrates from this gap into the inside of the seat, and water cannot be completely prevented from penetrating in the seat inside. As a result, water is absorbed in the cushioning material in the seat inside, and deterioration of the cushioning material leads to declined seat function.

SUMMARY

Accordingly, the object of the present invention is to provide an outdoor vehicle seat that prevents water from penetrating from the stitched portion of the surface skin, or the portion between the surface skin end portion and the bottom plate.

In order to achieve the above object, according to one aspect of the present invention, there is provided an outdoor vehicle seat that is formed by arranging a cushioning material on a bottom plate, covering the cushioning material with a surface skin, and fixing a surface skin end portion to the bottom plate, wherein a highly water absorbing, highly moisture absorbing, and highly expanding member is arranged between the surface skin end portion and the bottom plate.

Thus, in the outdoor vehicle seat according to an embodiment of the present invention, where the highly water absorbing, highly moisture absorbing, and highly expanding member is arranged between the surface skin end portion and the bottom plate, it is possible to rapidly absorb water penetrating from the gap between the surface skin end portion and the bottom plate, seal up the gap completely by the expansion thereof, and prevent water from penetrating into the seat inside.

Accordingly, it is possible to prevent the seat function from declining due to the deterioration of the cushioning material by water penetration into the seat inside.

Further, it is preferable that in the bottom plate, an expanding member containing portion for arranging the highly water absorbing, highly moisture absorbing, and highly expanding member is formed at the portion to contact the surface skin end portion of the back side.

Thus, by forming the expanding member containing portion in the bottom plate, it is possible to secure the place to contain the expanding member and position and fix it, and thereby it is possible to improve the workability in manufacture processes.

In order to achieve the above object, according to another aspect of the present invention, there is provided an outdoor vehicle seat that is formed by arranging a cushioning material on a bottom plate, covering the cushioning material with a surface skin, and fixing a surface skin end portion to the bottom plate, wherein the surface skin includes a covering surface skin for covering the cushioning material, a jointing surface skin for structuring the surface skin end portion to be fixed to the bottom plate, a stitched portion to sew together the covering surface skin and the jointing surface skin, and a highly water absorbing, highly moisture absorbing, and highly expanding member is arranged between the covering end portion and the jointing end portion, in the stitched portion.

Thus, in the outdoor vehicle seat according to an embodiment of the present invention, where the highly water absorbing, highly moisture absorbing, and highly expanding member is arranged between the covering end portion and the jointing end portion of stitched portion, it is possible to rapidly absorb water penetrating from the stitched portion, and seal off further penetration of water completely, by the expansion thereof, and prevent water from penetrating into the seat inside. Accordingly, it is possible to prevent the seat function from declining due to the deterioration of the cushioning material by water penetration into the seat inside.

Furthermore, it is preferable that the highly water absorbing, highly moisture absorbing, and highly expanding member has airspaces. Thus, when the expanding member has airspaces, it is possible to absorb an expansion amount accompanying expansion by the airspaces, prevent the expanding member from coming out from the stitched portion, and prevent the fixing member and the like from dropping down or the sewed portion from being damaged in end processed portion and sewed portion, which is caused by expansion of the expanding member.

Moreover, it is preferable that the highly water absorbing, highly moisture absorbing, and highly expanding member includes at least highly water absorbing, highly moisture absorbing, and highly expanding fibers that are fibers of a highly water absorbing, highly moisture absorbing, and highly expanding material.

Thus, by using fibers of a highly water absorbing, highly moisture absorbing, and highly expanding material, it is possible to join the fibers to base fibers and easily process the fibers into shapes according to applications of the vehicle seat.

Further, it is preferable that the highly water absorbing, highly moisture absorbing, and highly expanding member is made of powders of a highly water absorbing, highly moisture absorbing, and highly expanding material packaged by non-woven cloth or coarse wool cloth.

Thus, by packaging powders of a highly water absorbing, highly moisture absorbing, and highly expanding material by nonwoven cloth or coarse wool cloth, it is possible to hold the powdered highly water absorbing, highly moisture absorbing, and highly expanding material without leakage. Further, in comparison with the case where highly water absorbing, highly moisture absorbing, and highly expanding fibers are combined with base fibers with a binder and the like, the powdered material can be used without a special process, and accordingly it is possible to reduce the number of processes.

Furthermore, it is preferable that the highly water absorbing, highly moisture absorbing, and highly expanding material is made of bridged polyacryl acid sodium salt.

Thus, by using bridged polyacryl acid sodium salt, it is possible, by its high water absorbing, highly moisture absorbing, and highly expanding property, to absorb water further more rapidly, seal up the gap completely by the expansion thereof, and prevent water from further penetrating into the seat inside.

Thus, in the outdoor vehicle seat according to an embodiment of the present invention, where the highly water absorbing, highly moisture absorbing, and highly expanding member is arranged between the surface skin end portion and the bottom plate, or between the covering surface skin and the jointing surface skin, it is possible to rapidly absorb water penetrating inside, and seal up the gap completely by the expansion thereof, and prevent water from penetrating into the seat inside. Accordingly, it is possible to prevent the seat function from declining due to the deterioration of the cushioning material by water penetration into the seat inside.

DETAILED DESCRIPTION OF THE PREFERRED EMBODIMENTS

A preferred embodiment according to the present invention is illustrated in more detail below with reference to the attached drawings. The illustrated and described structural members, arrangement thereof, and the like explained below do not limit the present invention, but may be modified according to the knowledge of one of skill in the art.

Figure 1:
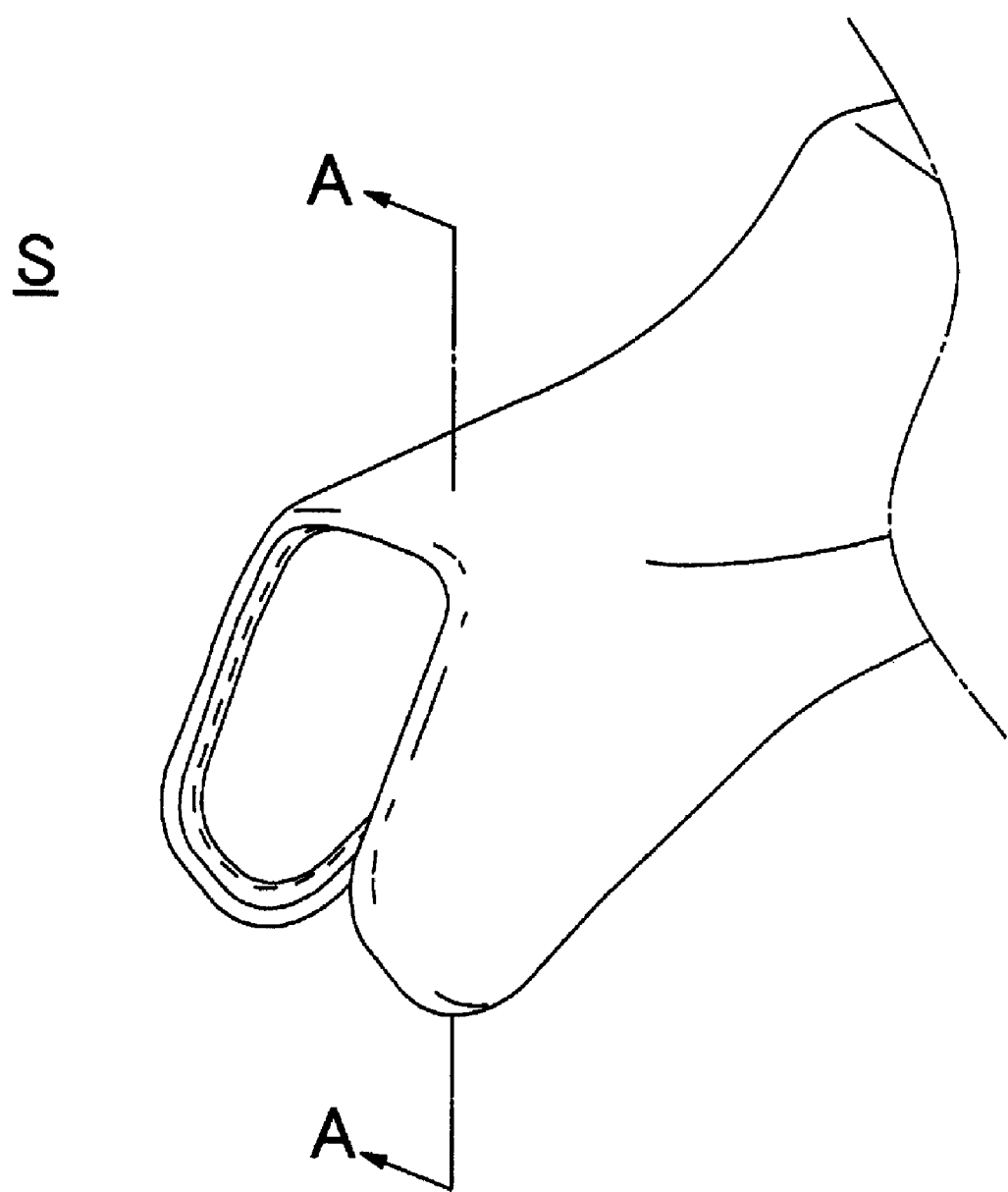
FIG. 1 is a partial perspective view of an outdoor vehicle seat according to an embodiment of the present invention.
Figure 2:
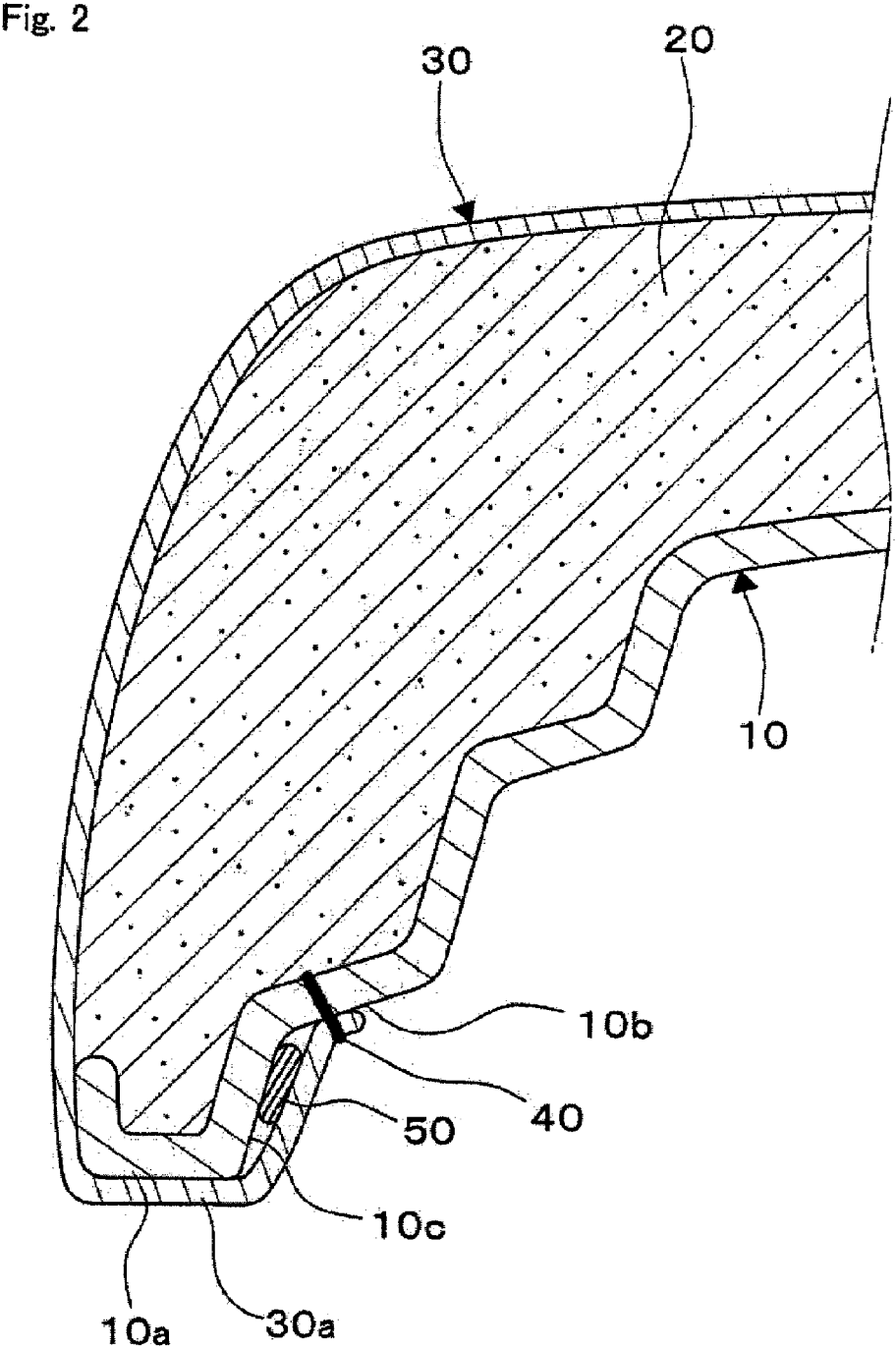
FIG. 2 is a partial cross sectional view at A-A in FIG. 1.
Figure 3:
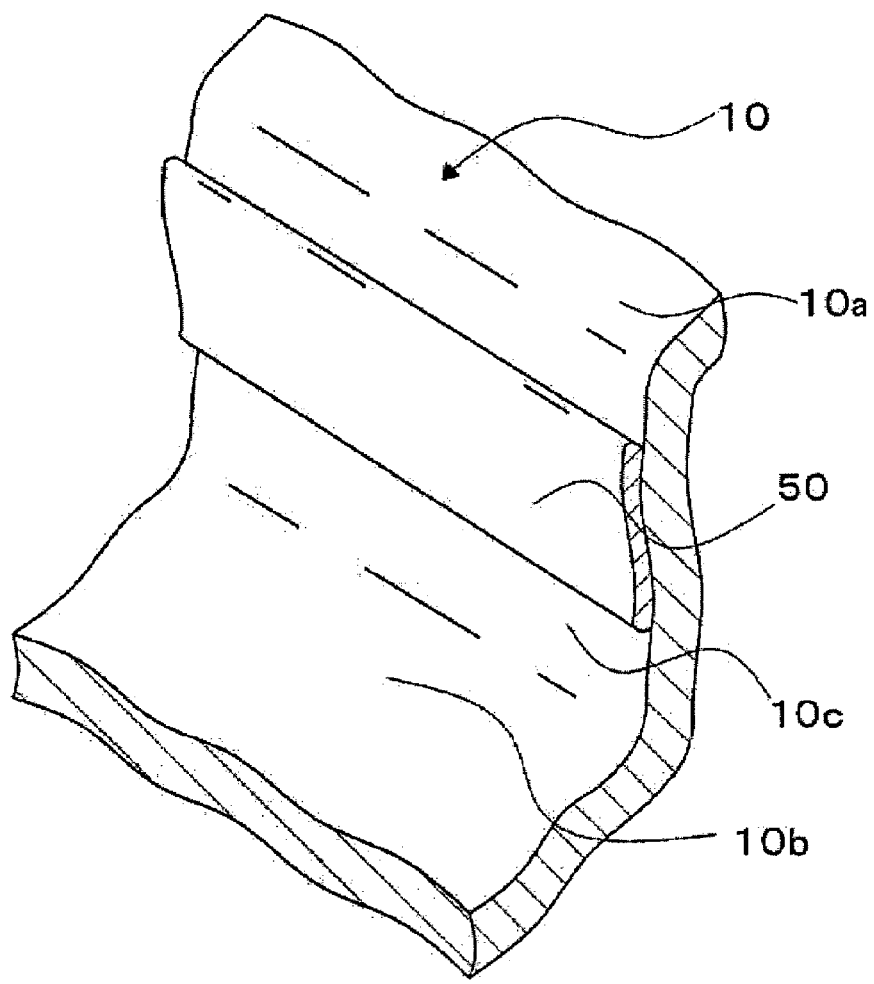
FIG. 3 is an explanatory perspective figure showing the arrangement of an expanding member according to one embodiment.
Figure 4:
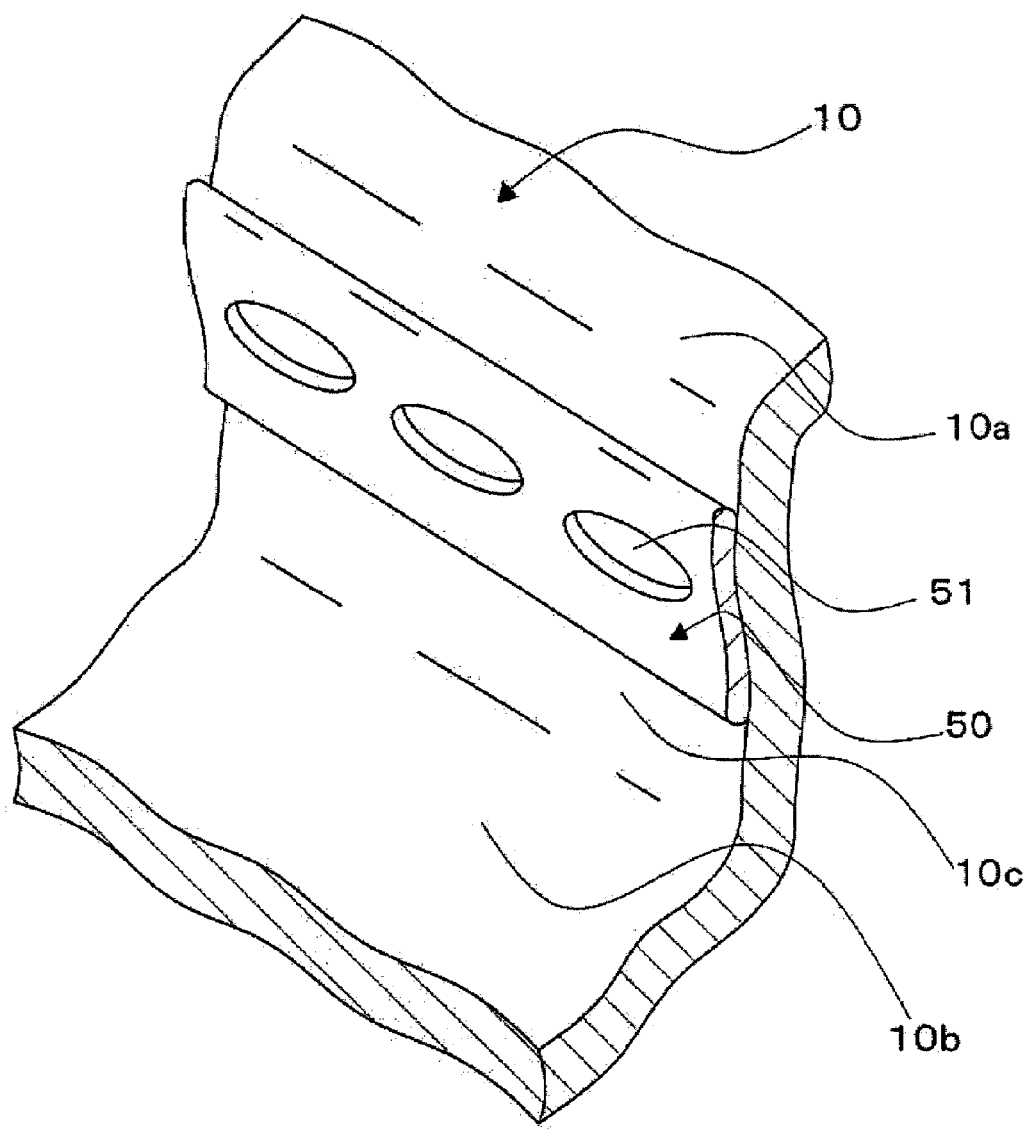
FIG. 4 is an explanatory perspective figure showing the arrangement of an expanding member according to another embodiment.
Figure 5:
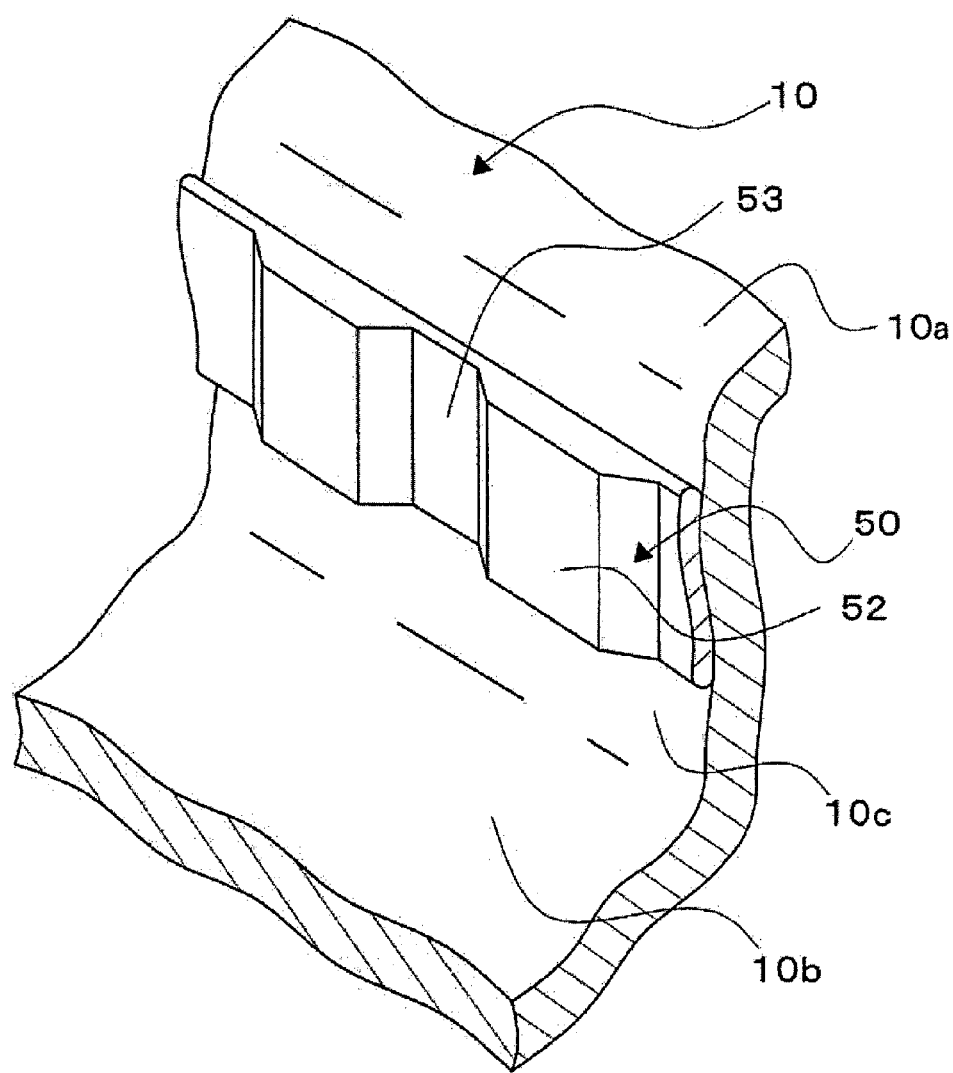
FIG. 5 is an explanatory perspective figure showing the arrangement of an expanding member according to a further embodiment.
Figure 6:
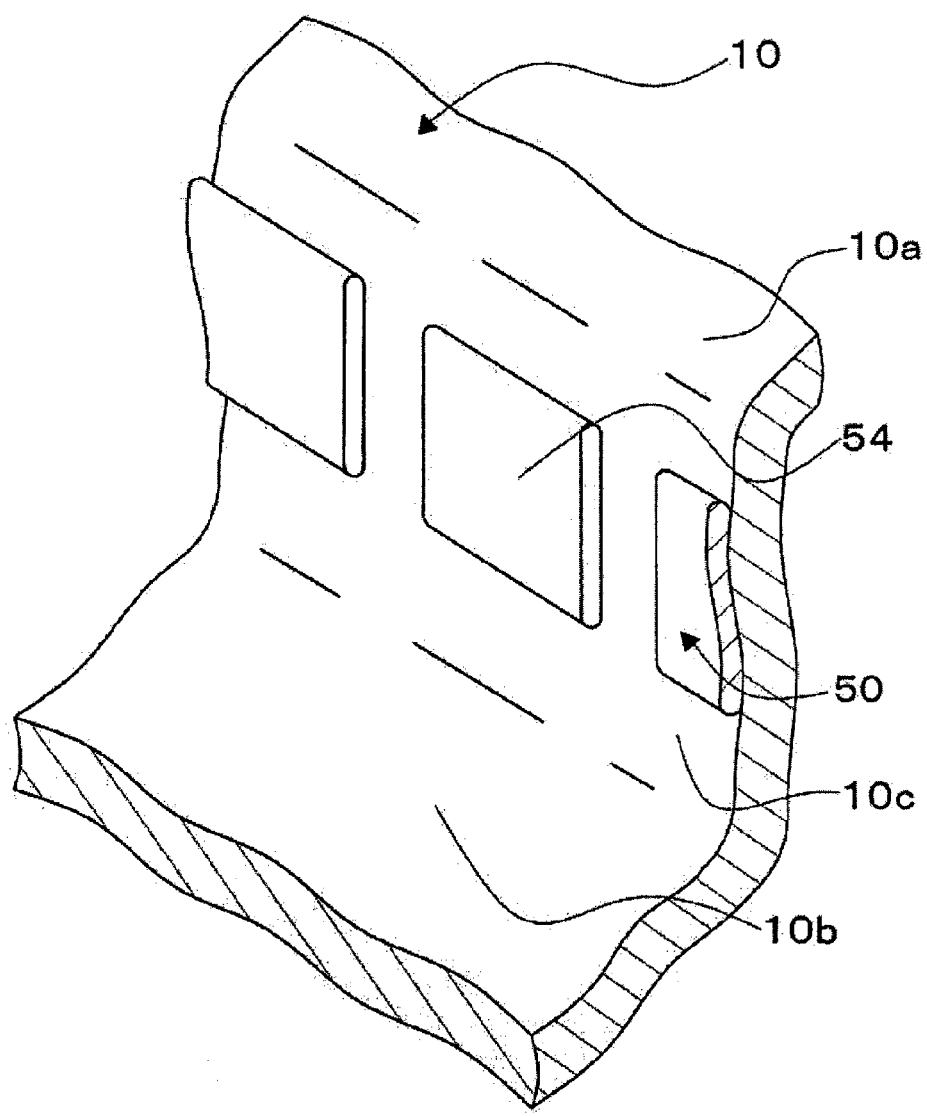
FIG. 6 is an explanatory perspective figure showing the arrangement of an expanding member according to a yet further embodiment.
Figure 7:
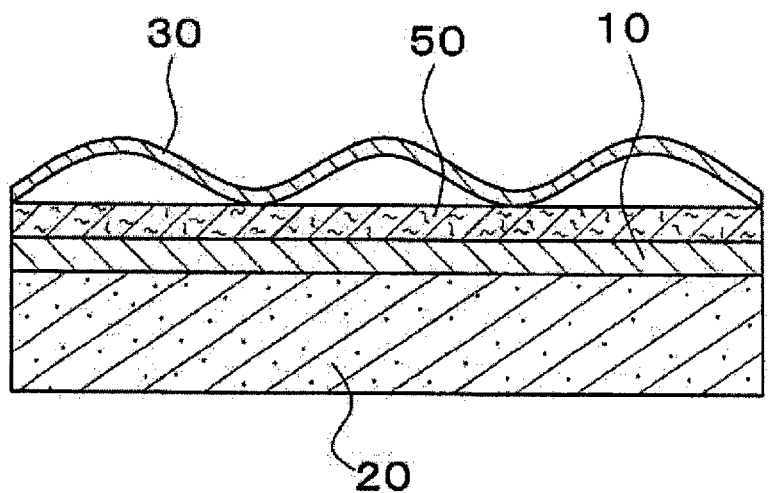
FIG. 7(a)(b) are explanatory side view figures showing a waterproof effect.
Figure 7:
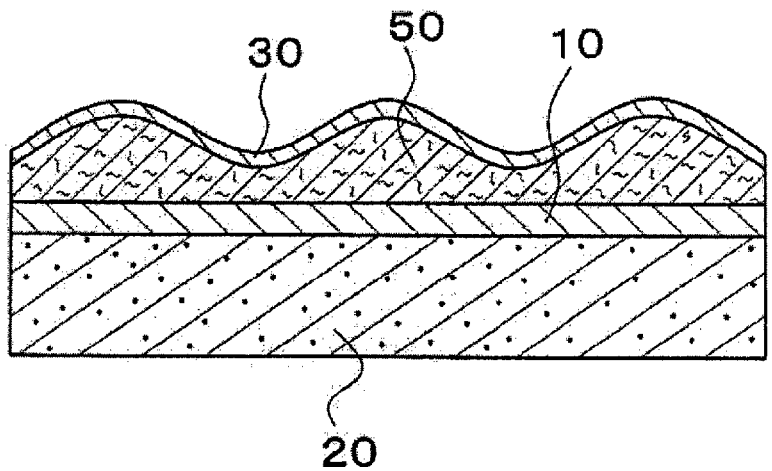
Figure 8:
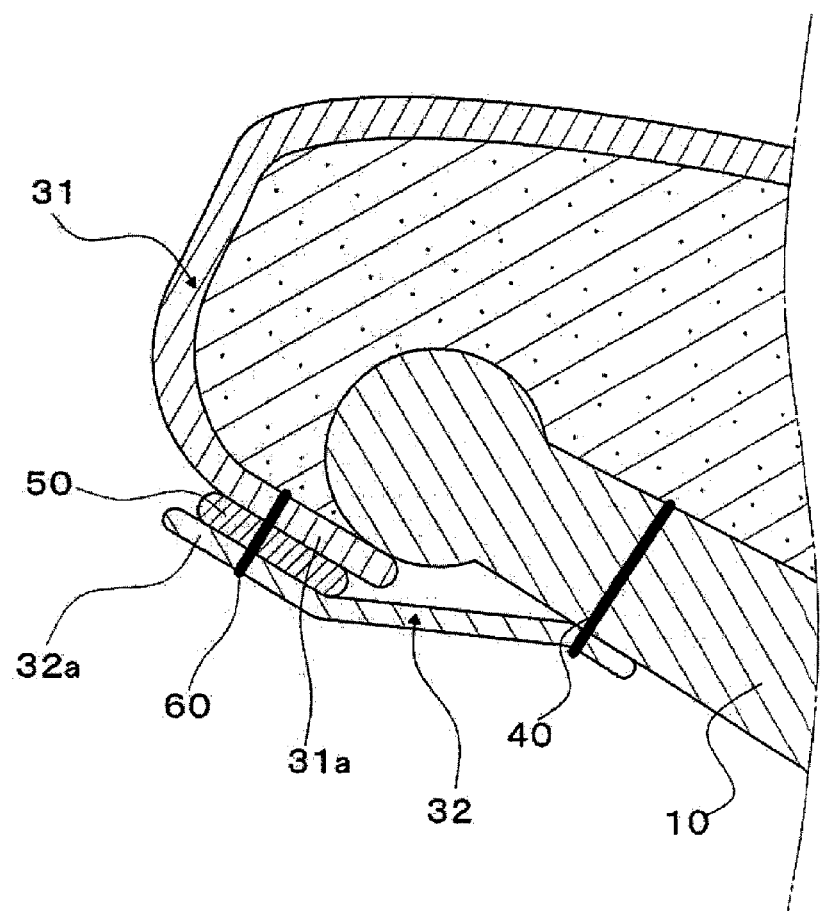
FIG. 8 is a partial cross sectional view showing another preferred embodiment.
Figure 9:
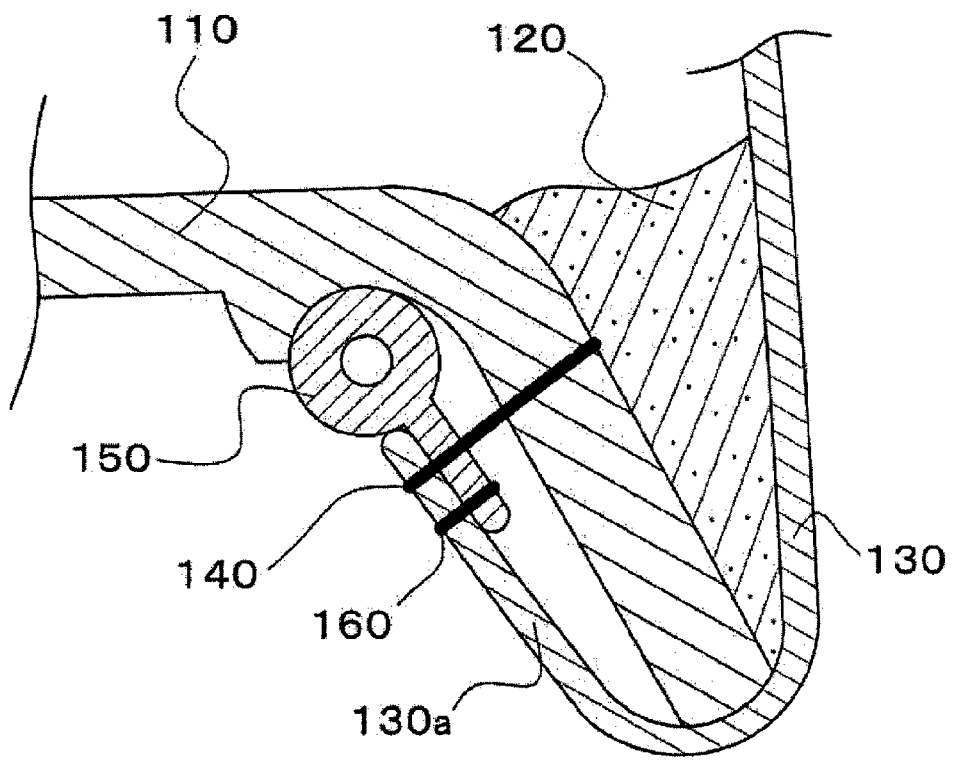
FIG. 9 is a partial cross sectional view showing an outdoor vehicle seat according to the prior art.
Figure 10:
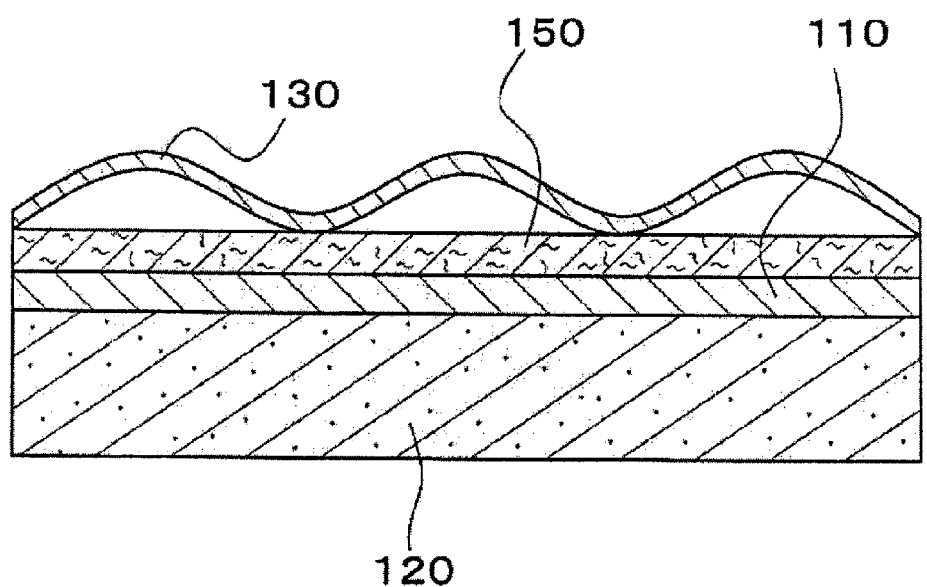
FIG. 10 is an explanatory side view figure showing a waterproof effect according to the prior art.

FIG. 1 through FIG. 4 show a first preferred embodiment according to the present invention. FIG. 1 is a partial perspective view of an outdoor vehicle seat, FIG. 2 is a partial cross sectional view at A-A in FIG. 1, FIG. 3 is an explanatory figure showing the arrangement of an expanding member, FIG. 4 is an explanatory figure showing the arrangement of an expanding member as another example, FIG. 5 is an explanatory figure showing the arrangement of an expanding member as still another example, FIG. 6 is an explanatory figure showing the arrangement of an expanding member as yet another example, and FIG. 7 is an explanatory figure showing a waterproof effect. Further, FIG. 8 is a partial cross sectional view showing another preferred embodiment.

In the present preferred embodiment, as an outdoor vehicle seat S, a two-wheel vehicle seat is used for illustrative purposes, although the outdoor vehicle seat S includes not only seats for two-wheel vehicles, that is, land motorbikes, and scooters, it also includes seats for snowmobiles, personal watercraft and the like, and further includes vehicle seats for three-wheel buggies and the like and riding type passenger vehicles, or construction machines.

The outdoor vehicle seat S according to the present preferred embodiment is, as shown in FIG. 1 and FIG. 2, formed by placing a cushioning material 20 on a bottom plate 10, and covering them with a surface skin 30.

Further, a surface skin end portion 30a of the surface skin 30 is attached onto the bottom plate 10 with a fixing member 40 such as a staple and the like in the back side of the bottom plate 10.

The bottom plate 10 is injection molded of, for example PP (polypropylene), ABS resin and the like, in order to secure its rigidity. Further, a bottom plate 10 formed of polypropylene including glass fibers, polypropylene including filler may be used, and thereby it is possible to secure the rigidity without increasing the weight of the bottom plate 10. In the PPT, as reinforcing fibers, for example carbon fibers are mixed.

Further, the cushioning material 20 is formed of soft foam materials, for example, urethane foam, PP (polypropylene) foam, PE (polyethylene) foam, and is arranged on the bottom plate 10.

The surface skin 30 is made of, for example, vinyl chloride resin leather, artificial leather, natural leather and the like. Meanwhile, in the case of outdoor vehicle seats used outdoors, such as two-wheel vehicle seats and the like, like in the present preferred embodiment, it is preferable to form the surface skin of vinyl chloride resin leather and artificial leather and the like.

The bottom plate 10 is equipped with a surface skin contact portion 10a, a surface skin fixing portion 10b, and an expanding member containing portion 10c. The surface skin contact portion 10a is formed of the end portion of the bottom plate 10 and the back side of the bottom plate 10 bent from the end portion in L-shape. The surface skin fixing portion 10b is formed at the position a specified distance away from the surface skin contact portion 10a in the back side of the bottom plate 10. The expanding member containing portion 10c is formed along the circumference of the bottom plate 10 between the surface skin contact portion 10a and the surface skin fixing portion 10b of the bottom plate 10. This expanding member containing portion 10c is bent from the back side to the cushioning material 20 as a step portion.

Accordingly, the surface skin 30 is formed so as to contact the bottom plate 10 at the portion of the surface skin contact portion 10a and go to the back side, via the expanding member containing portion 10c, and fix the surface skin end portion 30a of the surface skin 30 with the surface skin fixing portion 10b.

The expanding member 50 according to the present preferred embodiment, as shown in FIG. 2 and FIG. 3, after the expanding member 50 formed into a band shape is put on the expanding member containing portion 10c, is covered with the surface skin end portion 30a of the surface skin 30, and then is fixed to the bottom plate 10 by the fixing member 40 such as a staple and the like, is fixed at the same time.

Thus, the expanding member 50 is arranged in the expanding member containing portion 10c of the bottom plate 10, and covered with the surface skin end portion 30a, and is fixed together with the surface skin end portion 30a; accordingly, it is possible to position and fix the expanding member 50, without using a new fixing member to fix the expanding member 50. Further, it is possible to reduce the number of parts and the number of processes accompanying the assembly.

The invention is not limited to the present preferred embodiment—an expanding member 50 formed into a band shape may be adhered to the surface skin end portion 30a by adhesive and the like beforehand, then the expanding member 50 may be adhered to the expanding member containing portion 10c of the bottom plate 10, and may be fixed with the fixing member 40 such as a staple and the like.

Thus, by adhering the expanding member 50 to the surface skin end portion 30a and to the expanding member containing portion 10c of the bottom plate 10, it is possible to position and easily fix the surface skin 30.

Further, as for the arrangement of the expanding member 50, the expanding member 50 may be adhered to the expanding member containing portion 10c of the bottom plate 10 by adhesive and the like beforehand, then covered with the surface skin 30, and fixed by the fixing member 40 such as a staple and the like.

Thus, the expanding member 50 is adhered to the expanding member containing portion 10c of the bottom plate 10, thereby making possible to easily fix the surface skin end portion 30a without displacement of the expanding member 50.

Furthermore, in the present preferred embodiment, as the expanding member 50, one formed into a band shape is employed; however, this band shaped member may be, as shown in FIG. 4, an expanding member 50 in which airspaces 51 are arranged.

Thus, by arranging the airspaces 51 in the expanding member 50, it is possible to reduce the amount of material used in the expanding member 50, and it is possible to absorb the expansion amount accompanying expansion by the airspaces, prevent the expanding member from coming out from the stitched portion, and prevent the fixing member and the like from dropping down or the sewed portion from being damaged in the end processed portion and sewed portion, which is caused by the expansion of the expanding member.

Moreover, by appropriately changing the number, and interval of the airspaces 51, according to particular applications, it is possible to adjust the water absorption amount by the expanding member 50 and the expansion rate. For example, in portions where the surface skin and the cushioning material are compressed, such as the end portion of the outdoor vehicle seat, the portion where the load from the user seating is significant and the like, it is preferable to reduce the number of the airspaces 51. On the other hand, in the portions where water is not easily absorbed, the number of the airspaces 51 may be increased, and the use amount of the expanding member 50 may be adjusted.

Further, according to the width of space formed by the expanding member containing portion 10c, the number thereof may be adjusted. For example, in the case where the surface skin end portion 30a is fixed at the position nearer to the expanding member containing portion 10c, the space formed by the expanding member containing portion 10c becomes narrower, and accordingly it is possible to seal off the space with smaller expansion of the expanding member 50. That is, it is possible to increase the number of the airspaces 51, and reduce the use amount of the expanding member 50.

Furthermore, the present invention is not limited to the example shown in FIG. 4, but as shown in FIG. 5, the expanding member 50 may be formed of plural convex portions 52 and concave portions 53. Moreover, as shown in FIG. 6, the expanding member 50 may be divided into plural pieces 54, which are arranged at specified intervals. This interval does not necessarily have to be constant, but may be changed appropriately according to particular applications.

Thus, by appropriately adjusting the numbers of the convex portions 52 and the concave portions 53, and the arrangement intervals and number of the divided pieces 54, it is possible to obtain the same effect as mentioned previously.

The expanding member 50 is not specifically limited in its composition, as long as it has a property of being highly expandable using water; in the present preferred embodiment, nonwoven cloth, or coarse wool cloth including at least highly water absorbing, highly moisture absorbing, and highly expanding fibers that absorb water on contacting water and expand is employed.

The materials may employ (as the nonwoven cloth, or coarse wool cloth including at least highly water absorbing, highly moisture absorbing, and highly expanding fibers), for example, those materials where the base fibers are made of resin, and are highly water absorbing, highly moisture absorbing, and highly expanding fibers: a) obtained by making a highly water absorbing, highly moisture absorbing, and highly expanding material into fibers, that are softened by heat at processing and combined mutually and made into nonwoven cloth; or, b) obtained by making a highly water absorbing, highly moisture absorbing, and highly expanding material into fibers, that are combined via a binder cured by heat at processing and made into nonwoven cloth.

As the base fibers, for example, PET (polyethylene terephthalate) fibers and PE (polyethylene) fibers may be used. Further, as the highly water absorbing, highly moisture absorbing, and highly expanding fibers, bridged polyacryl acid sodium salt system fibers, fibers where the surface of acrylic fibers is hydrolyzed by post processing and the like may be used. Further, as the binder, low melting point PET that solved by heat at processing and the like may be employed.

Meanwhile, in the present preferred embodiment, as the highly water absorbing, highly moisture absorbing, and highly expanding fibers, bridged polyacryl acid sodium salt system fibers that can absorb and hold a large amount of water by ion osmotic pressure, and little take off from the water, even under load or external force, are used. The bridged polyacryl acid sodium salt system fibers have 45 times the absorbing performance of its own weight in normal saline solution, and 150% the moisture absorbing performance under 95% relative moisture, and has the moisture absorbing performance approximately seven times that of cotton, and approximately twice that of B type silica gel.

Herein, the principle of water absorption expansion by the bridged polyacryl acid sodium salt is as described below. This bridged polyacryl acid sodium salt is salt having sodium carboxylate (COONa) at its end group. When water contacts the bridged polyacryl acid sodium salt, carboxyl groups and sodium that structure the end group separate off and ionize. At this moment, water absorption starts by osmotic pressure occurring by the concentration differences of sodium ions, and at the same time, carboxyl groups that have become negative ions act repulsively and intermolecular space expands.

FIG. 7 is an explanatory figure showing a waterproof effect. As shown in FIG. 7A, in the surface skin 30, when front and rear curved portions of the bottom plate 10 are covered, since a surplus of the surface skin end portion occurs, the surplus portions are collected up and fixed so that the surface skin end portion should overlap (should cause wrinkles), and accordingly, gaps are formed between the surface skin 30 and the bottom plate 10.

When water penetrates in from the gaps, water is absorbed by the expanding member 50. In the present preferred embodiment, as described previously, as the expanding member 50, the bridged polyacryl acid sodium salt is employed. That is, by osmotic pressure due to the concentration differences of ions and the reaction between negative ions, the expanding member absorbs incoming water more rapidly, and rapidly expands so as to seal up the gaps formed between the surface skin 30 and the bottom plate 10.

Thereby, as shown in FIG. 7B, it is possible to completely seal up the gaps formed between the surface skin 30 and the bottom plate 10, and reliably prevent water from penetrating into the inside of the seat.

As explained above, the expanding member 50 is arranged between the surface skin 30 and the bottom plate 10, and accordingly it is possible to prevent water from penetrating into the inside of the seat, and prevent the weight of the entire seat from increasing, and prevent a declining seat function.

Further, the expanding member 50 is arranged in the containing space formed by the expanding member containing portion 10c of the bottom plate 10 and the surface skin end portion 30a, and accordingly it is possible to position and fix the expanding member 50, without using a new fixing member to fix the expanding member 50.

Furthermore, as the expanding member, nonwoven cloth, or coarse wool cloth including at least highly water absorbing, highly moisture absorbing, and highly expanding fibers are employed, and accordingly, by rapid water absorption and expansion, it is possible to seal up gaps formed by wrinkles of the surface skin more rapidly, and reliably prevent water from penetrating into the inside of the seat.

FIG. 8 is a figure showing a second preferred embodiment, and in this second preferred embodiment, identical reference characters are provided to like members as in the first preferred embodiment, and repeated explanations thereof are omitted.

The present preferred embodiment is one where the expanding member 50 is used at a surface skin joint stitched portion 60 of an outdoor vehicle seat. The surface skin 30 in the present preferred embodiment is formed so that a covering surface skin end portion 31a of a covering surface skin 31 for covering a cushioning material 20, and jointing surface skin end portion 32a of a jointing surface skin 32 fixed to a bottom plate 10 with a fixing member 40 such as a staple and the like are sewed together so as to overlap at the surface skin joint stitched portion 60.

At this location, between the covering surface skin end portion 31a and the jointing surface skin end portion 32a, the expanding member 50 is arranged along their overlapped portion, and the covering surface skin end portion 31a, the jointing surface skin end portion 32a, and the expanding member 50 are sewed together as a body by machine-sewing and the like.

Thus, the expanding member 50 is arranged between the covering surface skin 31 and the jointing surface skin 32, and accordingly, it is possible to prevent water from penetrating into the inside of the seat, and prevent the seat function from declining.

Further, the covering surface skin end portion 31a, the jointing surface skin end portion 32a, and the expanding member 50 are sewed together as a body at the surface skin joint stitched portion 60, and accordingly it is possible to reliably fix the expanding member 50 to the overlapped portion of the covering surface skin end portion 31a and the jointing surface skin end portion 32a.

Furthermore, the covering surface skin end portion 31a, the jointing surface skin end portion 32a, and the expanding member 50 are firmly sewed together by machine-sewing and the like at the surface skin joint stitched portion 60, without using a fixing member such as a staple and the like, and accordingly it is possible to prevent a fixing member from dropping off due to expansion of the expanding member 50.

In the first and second preferred embodiments, as the expanding member, highly water absorbing, highly moisture absorbing, and highly expanding fibers combined with base fibers with a binder and the like are employed.

However, powders of a highly water absorbing, highly moisture absorbing, and highly expanding material made of bridged polyacryl acid sodium salt and the like packaged with an air ventilating material such as nonwoven cloth, or coarse wool cloth may be employed. Thus, by packaging the fibers with the air ventilating material such as nonwoven cloth, or coarse wool cloth, it is possible to hold the powdered highly water absorbing, highly moisture absorbing, and highly expanding material without leakage. Moreover, in comparison with the embodiments in which the highly water absorbing, highly moisture absorbing, and highly expanding fibers are combined with base fibers with a binder and the like, the powdered material can be used without a special process, and accordingly it is possible to reduce the number of processes needed for manufacture.

The air ventilating material such as nonwoven cloth, or coarse wool cloth used herein is to prevent the powdered highly water absorbing, highly moisture absorbing, and highly expanding material from leaking, and let incoming water and steam go through, may use nonwoven cloth such as normal vegetable fibers, animal fibers, recycled fibers, synthetic fibers and the like, or a foaming seat made of various resins and the like may.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. The particular implementations shown and described herein are illustrative examples of the invention and are not intended to otherwise limit the scope of the invention in any way. For the sake of brevity, conventional aspects may not be described in detail. Furthermore, the connecting lines, or connectors shown in the various figures presented are intended to represent exemplary functional relationships and/or or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". The word mechanism is intended to be used generally and is not limited solely to mechanical embodiments. Numerous modifications and adaptations will be readily apparent to those skilled in this art without departing from the spirit and scope of the present invention.

What is claimed is:

1. An outdoor vehicle seat, comprising:
a bottom plate;
cushioning material arranged on the bottom plate;
a surface skin covering the cushioning material, the surface skin having an end portion that is fixed to the bottom plate; and
a highly water absorbing, highly moisture absorbing, and highly expanding member that is arranged between the surface skin end portion and the bottom plate.

2. The outdoor vehicle seat according to claim 1, wherein the bottom plate comprises an expanding member containing portion for arranging the highly water absorbing, highly moisture absorbing, and highly expanding member that is formed at the expanding member containing portion that contacts the surface skin end portion of a back side.

3. The outdoor vehicle seat according to claim 1, wherein the highly water absorbing, highly moisture absorbing, and highly expanding member has air spaces.

4. The outdoor vehicle seat according to claim 1, wherein the highly water absorbing, highly moisture absorbing, and highly expanding member includes at least highly water absorbing, highly moisture absorbing, and highly expanding fibers that are fibers of a highly water absorbing, highly moisture absorbing, and highly expanding material.

5. The outdoor vehicle seat according to claim 1, wherein the highly water absorbing, highly moisture absorbing, and highly expanding member is powders of a highly water absorbing, highly moisture absorbing, and highly expanding material packaged by nonwoven cloth or coarse wool cloth.

6. The outdoor vehicle seat according to claim 1, wherein the highly water absorbing, highly moisture absorbing, and highly expanding material is made of bridged polyacryl acid sodium salt.

7. An outdoor vehicle seat, comprising:
a bottom plate;
cushioning material arranged on the bottom plate;
a surface skin that covers the cushioning material, the surface skin comprising:
an end portion that is fixed to the bottom plate;
a covering surface for the covering of the cushioning material;
a jointing surface skin for structuring the surface skin end portion to be fixed to the bottom plate; and
a stitched portion that sews together the covering surface skin and the jointing surface skin;
the seat further comprising:
a highly water absorbing, highly moisture absorbing, and highly expanding member that is arranged between the covering end portion and the jointing end portion, in the stitched portion.

8. The outdoor vehicle seat according to claim 7, wherein the highly water absorbing, highly moisture absorbing, and highly expanding member has air spaces.

9. The outdoor vehicle seat according to claim 7, wherein the highly water absorbing, highly moisture absorbing, and highly expanding member includes at least highly water absorbing, highly moisture absorbing, and highly expanding fibers that are fibers of a highly water absorbing, highly moisture absorbing, and highly expanding material.

10. The outdoor vehicle seat according to claim 7, wherein the highly water absorbing, highly moisture absorbing, and highly expanding member is powders of a highly water absorbing, highly moisture absorbing, and highly expanding material packaged by nonwoven cloth or coarse wool cloth.

11. The outdoor vehicle seat according to claim 7, wherein the highly water absorbing, highly moisture absorbing, and highly expanding material is made of bridged polyacryl acid sodium salt.

12. A method for forming an outdoor vehicle seat, comprising:
providing a bottom plate;
arranging a cushioning material on the bottom plate;
covering the cushioning material with a surface skin;
fixing an end portion of the surface skin to the bottom plate;
arranging a highly water absorbing, highly moisture absorbing, and highly expanding member between the surface skin end portion and the bottom plate.

13. The method according to claim 12, further comprising:
forming an expanding member containing a containing a portion for arranging the highly water absorbing, highly moisture absorbing, and highly expanding member at the portion to contact the surface skin end portion of a back side.

14. The method according to claim 12, further comprising:
creating air spaces in the highly water absorbing, highly moisture absorbing, and highly expanding member.

15. The method according to claim 12, further comprising:
packaging the highly water absorbing, highly moisture absorbing, and highly expanding member, which is made of a powder, by nonwoven cloth or coarse wool cloth.

16. A method for forming an outdoor vehicle seat, comprising:
providing a bottom plate;
arranging a cushioning material on the bottom plate;
covering the cushioning material with a covering surface of a surface skin having an end portion;
structuring the surface skin end portion to be fixed to the bottom plate at a jointing surface skin of the surface skin;
sewing together the covering surface skin and the jointing surface skin at a stitched portion of the surface skin; and
arranging a highly water absorbing, highly moisture absorbing, and highly expanding member between the covering end portion and the jointing end portion, in the stitched portion.

17. The method according to claim 16, further comprising:
creating air spaces in the highly water absorbing, highly moisture absorbing, and highly expanding member.

18. The method according to claim 16, further comprising:
packaging the highly water absorbing, highly moisture absorbing, and highly expanding member, which is made of a powder, by nonwoven cloth or course wool cloth.

* * * * *